(12) United States Patent
Tsuchiya

(10) Patent No.: US 6,182,645 B1
(45) Date of Patent: Feb. 6, 2001

(54) EXHAUST GAS RECIRCULATION CONTROL APPARATUS FOR INTERNAL COMBUSTION ENGINE

(75) Inventor: Tomihisa Tsuchiya, Toyota (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/285,117

(22) Filed: Apr. 1, 1999

(30) Foreign Application Priority Data

Dec. 6, 1998 (JP) .................................................. 10-165229

(51) Int. Cl.⁷ ................................................... F02M 25/07
(52) U.S. Cl. ........................................................ 123/568.23
(58) Field of Search ........................ 123/568.21, 568.23, 123/568.24

(56) References Cited

U.S. PATENT DOCUMENTS

| | | | |
|---|---|---|---|
| 4,257,382 | 3/1981 | Matsui et al. | 123/438 |
| 4,448,177 | 5/1984 | Hasegawa et al. | 123/568.27 |
| 4,674,464 | * 6/1987 | Akagi | 123/568.24 |
| 4,825,840 | * 5/1989 | Hewette et al. | 123/568.24 |
| 5,184,593 | * 2/1993 | Kobayashi | 123/568.24 |
| 5,503,131 | * 4/1996 | Ohuchi | 123/568.24 |
| 5,579,743 | * 12/1996 | Kadowaki | 123/568.24 |
| 6,012,437 | * 1/2000 | Radhamohan et al. | 123/568.23 |

FOREIGN PATENT DOCUMENTS

| | | |
|---|---|---|
| 0 810 361 | 12/1997 | (EP) . |
| 0 887 540 | 12/1998 | (EP) . |
| 2-095763 | 4/1990 | (JP) . |
| 9-32651 | 2/1997 | (JP) . |
| 9-154299 | 6/1997 | (JP) . |

\* cited by examiner

*Primary Examiner*—Willis R. Wolfe
(74) *Attorney, Agent, or Firm*—Kenyon & Kenyon

(57) ABSTRACT

In an exhaust gas recirculation control apparatus for an internal combustion engine, an outward opening type exhaust gas recirculation (EGR) valve arranged so that an exhaust gas pressure acts in a closing direction thereof is provided in an EGR passage of the internal combustion engine. The EGR valve is driven for opening and closing by a stepping motor which is driven and controlled by an electronic control apparatus. The electronic control apparatus estimates a magnitude of a difference between an intake negative pressure and a back pressure acting on the EGR control valve based on an output of an intake pressure sensor, and varies the driving speed of the stepping motor when the EGR control valve opens from its fully closed position in accordance with a magnitude of the pressure difference.

10 Claims, 5 Drawing Sheets

EXHAUST GAS RECIRCULATION CONTROL APPARATUS FOR INTERNAL COMBUSTION ENGINE

INCORPORATION BY REFERENCE

The disclosure of the priority document Japanese Patent Application No. HEI 10-165229 filed on Jun. 12, 1998 including the specification, drawings and abstract is incorporated herein by reference in its entirety.

BACKGROUND OF THE INVENTION

1. Field of the Invention

The present invention relates to an exhaust gas recirculation control apparatus for an internal combustion engine for adjusting an amount of exhaust gas recirculated to an intake passage through an exhaust gas recirculation passage of an internal combustion engine, and more particularly, to a preferable control structure employed to an apparatus having an outward opening type exhaust gas recirculation control valve which is opened by lifting a valve element from an intake passage side to an exhaust passage side of an exhaust gas recirculation passage.

2. Description of the Related Art

Conventionally, in order to satisfy emission control requirements or to enhance fuel efficiency, exhaust gas recirculation (EGR) control is conducted to recirculate to an intake passage a portion of exhaust gas discharged from an internal combustion engine to lower a temperature of combustion gas. In an internal combustion engine conducting EGR control, an EGR passage is provided for bringing the exhaust passage and the intake passage into communication, and an amount of recirculated exhaust gas is controlled based on adjustment of opening degree of an EGR control valve provided in the EGR passage.

One of such EGR control apparatuses is described in Japanese Patent Application Laid-open No. HEI 9-154299 in which an EGR control valve is driven for opening and closing by a stepping motor.

Normally, external force such as a pressure difference between intake negative pressure and exhaust gas pressure (back pressure) is applied to the EGR control valve. Therefore, the stress applied to the EGR control valve is different when the EGR control valve is driven in its opening direction than in it is when driven in its closing direction, and a required driving torque is also different. Further, a required response of the EGR control valve also differs depending on the driving direction.

For example, in the case of an outward opening type EGR control valve which is opened by lifting a valve element from an intake passage side to an exhaust passage side of an EGR passage, a pressure difference between the intake negative pressure and the back pressure, and the stress based on the flowing resistance of the exhaust gas flowing in the EGR passage act in the closing direction of the EGR control valve. Therefore, in such an outward opening type EGR control valve, a driving torque required when the valve is driven in its opening direction is higher than that required when it is driven in its closing direction because the valve must be driven against the pressure difference. Further, in the EGR control valve, in general, in order to suppress deterioration in emissions generated due to delay in EGR reduction at a time of acceleration, the response time required when the valve is closed is faster than that required when the valve is opened.

Therefore, the EGR control apparatus described in the aforementioned publication is controlled such that a driving speed of the EGR control valve is changed depending on whether the EGR control valve is being driven in the opening direction or the closing direction. That is, in the EGR control apparatus, the driving speed is decreased when a large driving torque is required and at the time of opening operation of the valve when a level of required response is low, and the driving speed is increased at the time of closing operation of the valve when the level of the required response is high.

An electric motor such as a stepping motor employed as a driving device of the EGR control valve in the EGR control apparatus generally has a characteristic that the driving torque generated and the driving speed (the number of revolution of the motor) are opposed to each other and therefore, if the driving speed is decreased, the generated driving torque is increased, and if the driving speed is increased, the generated driving torque is decreased. Therefore, by changing the driving speed depending on the driving direction as described above, the driving torque when the valve is driven for opening can be secured and the response speed when the valve is driven for closing can be increased, and it is possible to control the operation of the EGR control valve even with a small and inexpensive stepping motor for generating a small output.

Meanwhile, it has been confirmed that the magnitude of the external force like the pressure difference acting on the EGR control valve is not always constant, and the magnitude varies in accordance with a driving state of the internal combustion engine or the opening position of the EGR control valve. However, In the EGR control apparatus of the above publication, the driving speed is uniformly changed in accordance with the valve opening operation or the valve closing operation. Therefore, even when the external force actually acting on the EGR control valve is small and thus the driving torque required at that time is not so great, the driving speed may unnecessarily be decreased, and sufficient response of the EGR control apparatus may not be obtained.

SUMMARY OF THE INVENTION

The present invention has been accomplished in view of the above circumstances, and it is an object of the invention to provide an exhaust gas recirculation control apparatus for an internal combustion engine capable of maintaining a required driving torque of an EGR valve, and maintaining a response at opening/closing of the EGR valve as high as possible.

To achieve the above object, according to a first aspect of the present invention, there is provided an exhaust gas recirculation control apparatus for an internal combustion engine including: an outward opening type control valve for adjusting a flow rate of an exhaust gas recirculated through an exhaust gas recirculation passage of the internal combustion engine, a pressure of the exhaust gas being exerted in a closing direction of the control valve; driving means having a characteristic that a driving speed is in inverse relation to a driving torque when the control valve is opened and closed, which drives the control valve for opening and closing; and control means for changing the driving speed of the driving means when the control valve is driven in its opening direction in accordance with a force external to the driving force of the driving means acting on the control valve.

In the outward opening type EGR control valve which is opened by lifting a valve element from an intake passage side to an exhaust passage side of an exhaust gas recirculation (EGR) passage, a force based on fluid resistance of an exhaust gas flowing through the EGR passage acts in a valve closing direction. Therefore, a large driving torque is required when the valve is opened. An electric motor such as a stepping motor may be used as the driving means for opening and closing the EGR control valve. The aforementioned electric motor has a characteristic that the driving speed inversely relates to the driving torque. That is, if the driving speed is increased, the driving torque is decreased, and if the driving speed is decreased, the driving torque is increased. The above structure makes it possible to maintain a required driving torque and to maintain the response as high as possible, by changing the driving speed in accordance with the external force acting on the control valve. Therefore, it is possible to maintain good control response, and to reliably open and close the EGR control valve, even with a small and inexpensive motor for generating a small output.

Further, in the exhaust gas recirculation control apparatus for the internal combustion engine of the first aspect, the control means changes a driving speed when the control valve is driven in its opening direction in accordance with a pressure difference between an exhaust gas pressure and an intake pressure acting on the control valve.

A magnitude of the external force such as flowing resistance of the exhaust gas acting on the EGR control valve can be estimated from a magnitude of a pressure difference between the exhaust gas pressure and the intake pressure. Therefore, with the above structure, the magnitude of the external force acting on the EGR control valve is estimated based on a pressure difference between the exhaust gas pressure and the intake pressure, and the driving speed of the driving means is changed in accordance with the pressure difference, thereby satisfying requirements of both the driving torque and the response.

According to a second aspect, there is provided an exhaust gas recirculation control apparatus for an internal combustion engine including: an outward opening type control valve for adjusting a flow rate of an exhaust gas recirculated through an exhaust gas recirculation passage of the internal combustion engine, a pressure of the exhaust gas being exerted in a closing direction of the control valve; driving means for opening and closing the control valve, the driving means having a characteristic that a driving speed is in inverse relation to a driving torque when the control valve is opened and closed; and control means for changing the driving speed of the driving means during valve opening from a fully closed position of the control valve in accordance with a pressure difference between an exhaust gas pressure and an intake pressure acting on the control valve.

In the case of the outward opening type EGR control valve, as the pressure difference between the exhaust gas pressure and the intake pressure acts on the valve element when the EGR control valve is in its fully closed position, especially great driving force is required when the EGR control valve starts opening from the fully closed position. The pressure difference varies in accordance with the driving state of the internal combustion engine. The above structure makes it possible to secure the required amount of driving torque and improve the response as high as possible by changing, in accordance with the pressure difference, the driving speed when the EGR control valve is opened from its fully closed position, while securing the required driving torque.

In both the first and second aspects, there may further be provided estimating means for estimating the pressure difference between the exhaust gas pressure and the intake pressure acting on the control valve based on the revolution speed of the engine and a load thereof.

With this structure, since the magnitude of the pressure difference between the exhaust gas pressure and the intake pressure can be estimated without adding a special sensor, the structure is simplified and costs can be reduced.

According to a third aspect of the invention, there is provided an exhaust gas recirculation control apparatus for an internal combustion engine including: an outward opening type control valve for adjusting a flow rate of an exhaust gas recirculated through an exhaust gas recirculation passage of the internal combustion engine, a pressure of the exhaust gas being exerted in a closing direction of the control valve; driving means for opening and closing the valve, the driving means having a characteristic that a driving speed is in inverse relation to a driving torque when the control valve is opened and closed; and control means for controlling the driving means such that a driving speed of the driving means upon opening the valve from a fully closed position becomes slower than a driving speed of the driving means in the valve opening direction after the control valve has been partially opened.

As described above, when the outward opening type EGR control valve starts opening from its fully closed position, an especially great driving torque is required to cope with the pressure difference between the exhaust gas pressure and the intake pressure exerted on the valve element. However, if the EGR control valve once leaves from the fully opened position and opens, the external force acting on the control valve becomes small and thus, the required driving torque also becomes small. Therefore, the above structure makes it possible to secure the driving torque required when the valve opens from its fully closed position and to improve the response when the valve opens, by retarding a driving speed after the valve has partially opened to a speed slower than the initial driving speed.

In the first to third aspects, a stepping motor may be employed as the driving means.

DETAILED DESCRIPTION OF THE PREFERRED EMBODIMENTS

An embodiment of the present invention will be explained hereinafter.

Figure 1:
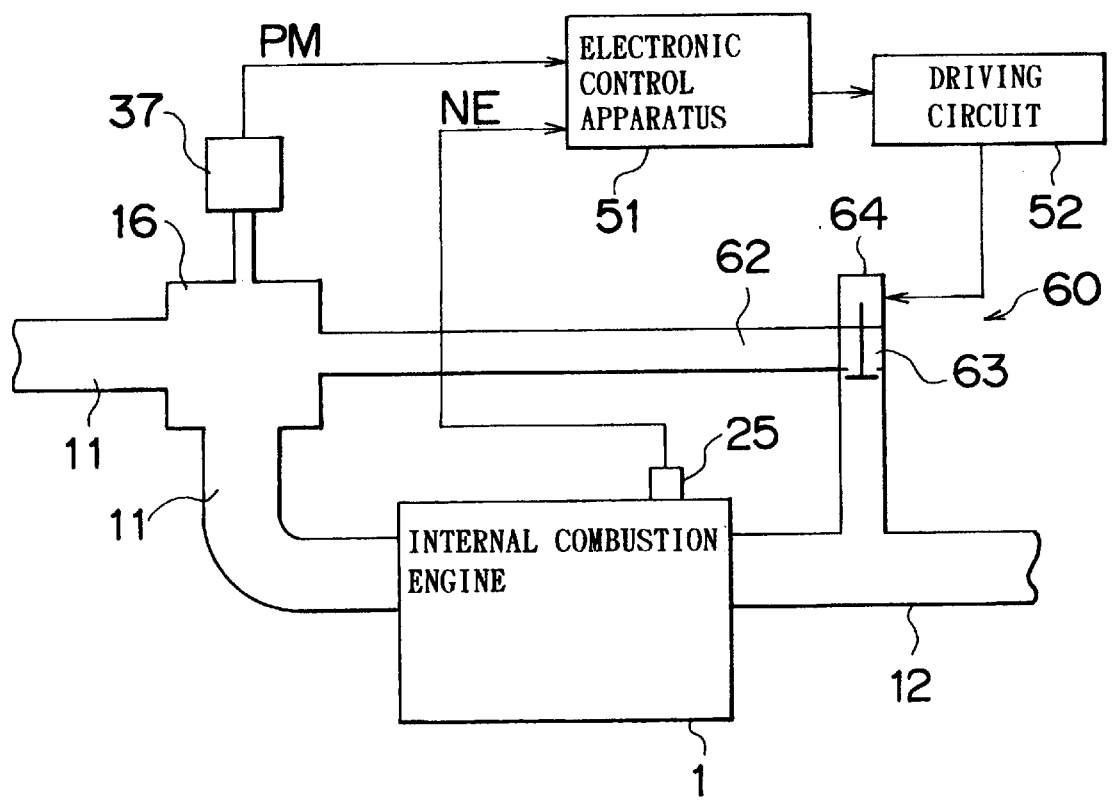
FIG. 1 is a view showing a schematic structure of an internal combustion engine in which an EGR control apparatus according to a first embodiment of the present invention is provided.

A schematic structure of an internal combustion engine including the embodiment of an exhaust gas recirculation apparatus of the present invention will be explained referring to FIG. 1.

An exhaust gas circulation (EGR) passage 62 for bringing an intake passage 11 and an exhaust passage 12 into communication with each other is connected to a surge tank 16 provided in the intake passage 11 of the internal combustion engine 1. In the EGR passage 62, there is provided an EGR control valve 63 for adjusting an amount of exhaust gas recirculated to the intake passage through the EGR passage 62. The EGR control valve 63 is opened and closed by a stepping motor 64. The stepping motor 64 is driven by a driving circuit 52 operated based on a command signal output from an electronic control apparatus 51 which conducts various controls in the internal combustion engine 1. These EGR passage 62, EGR control valve 63, the stepping motor 64 for opening and closing the control valve 63, the electronic control apparatus 51, the driving circuit 52 and the like constitute an EGR control apparatus 60.

Further, the surge tank 16 of the intake passage 11 is provided with an intake pressure sensor 37 for detecting a pressure (intake negative pressure) PM of intake air in the surge tank 16. The internal combustion engine 1 is provided with a revolution sensor 25 for detecting a revolution speed (engine revolution number) NE of an output shaft of the internal combustion engine 1. Detection signals from these intake pressure sensor 37 and the revolution sensor 25 are sent to the electronic control apparatus 51.

Figure 2:
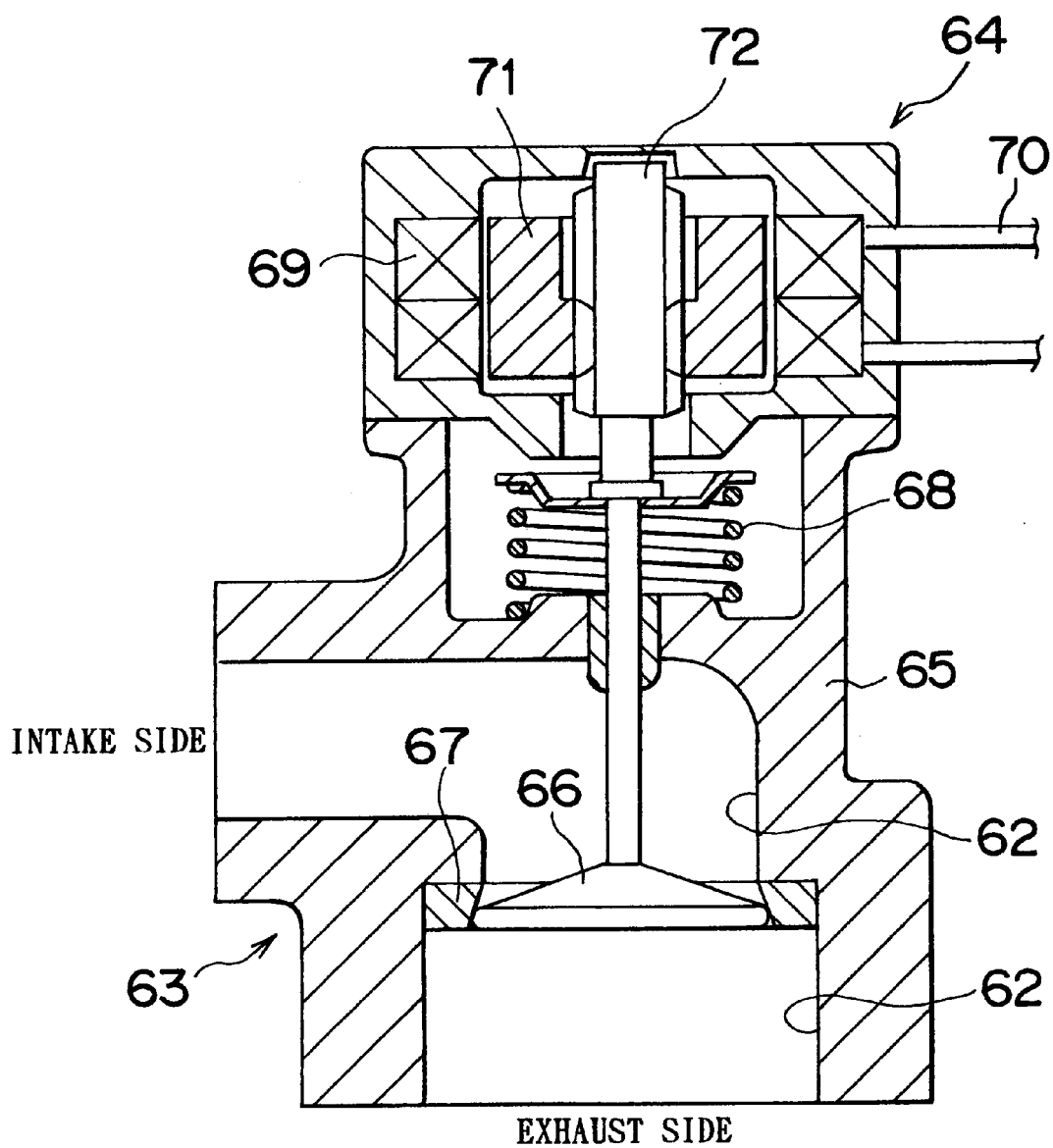
FIG. 2 is a cross section showing structure of an EGR control valve and a stepping motor of the EGR control apparatus.

Referring to FIG. 2, further detailed structure of the EGR control apparatus 60 will be explained below.

FIG. 2 shows a structure in section of a valve body in which the EGR control valve 63 and the stepping motor 64 are accommodated.

The valve body 65 is provided at an intermediate portion of the EGR passage 62. A valve element provided in the valve body 65 is disposed in the EGR passage 62, and is designed to be lifted in its axial direction. When the valve is fully closed, the valve element 66 is tightly in contact with a valve seat 67 to close the EGR passage 62. The valve element 66 is biased in the closing direction by a spring 68, and is pressed in the opening direction by a rotor shaft 72. The spring 68 enhances the tight contacting force between the valve element 66 and the valve seat 67 so as to reliably disconnect the EGR, and also enhances a response time of the valve when it is driven into the closing state as described later.

The stepping motor 64 formed of a driving coil 69, a terminal 70 and a rotor 71 is also accommodated in the valve body 65.

Exciting voltage is applied to the driving coil 69 from the driving circuit 52 (FIG. 1) through the terminal 70. Upon application of the exciting voltage, the driving coil 69 is excited, and the rotor 71 constituted by a permanent magnet is positioned in a predetermined phase. By sequentially varying the pattern of exciting voltage applied to the driving coil 69, the rotor 71 is rotated at predetermined angles.

The rotor 71 has a hollow cylindrical shape, and a screw groove is formed in its inner peripheral surface. The rotor shaft 72 is slidably disposed in the hollow portion of the rotor 71. A screw groove is also formed in an outer periphery of the rotor shaft 72 so as to be engaged with the screw groove of the inner periphery of the rotor 71. The turning movement of the rotor shaft 72 is restrained by a recess-projection relation which is not shown. Therefore, when the rotor 71 is turned, the rotor shaft 72 slides in the axial direction. With this sliding movement of the rotor 72, the valve element 66 is pressed and lifted by the rotor shaft 72 so as to be opened and closed. With these operations, the valve element 66 is opened and closed.

In the EGR control apparatus 60 having the above-described structure, a lift amount of the valve element 66, i.e., the opening degree of the EGR control valve 63 can be estimated by counting the frequency of changing the pattern of the exciting voltage applied to the driving coil 69. Further, a driving speed for opening and closing the EGR control valve is changed synchronously with change of the pattern. As described above, the driving circuit 52 for changing the pattern of the exciting voltage applied to the driving coil 69 is operated based on the command signal sent from the electronic control apparatus 51.

With the aforementioned stepping motor 64, in general, if the driving speed is increased, the generated torque is decreased, and if the driving speed is decreased, high torque can be obtained.

Figure 3:
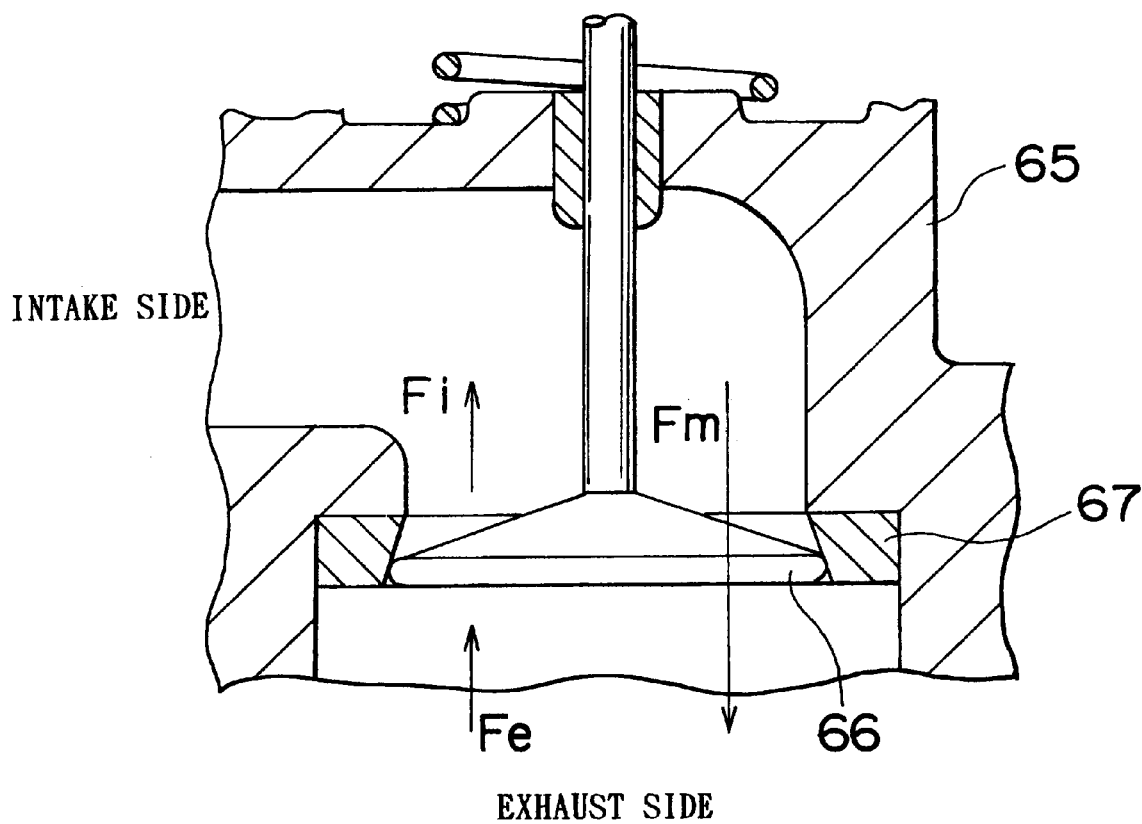
FIG. 3 is a view for explaining how external force acts on the EGR control valve.

In the EGR control valve 63, a force acting on the valve element 66 in a fully closed state will be explained referring to FIG. 3.

The EGR control valve 63 of the present embodiment is an outward opening type EGR control valve in which a pressure difference between the intake negative pressure PM in the intake passage 11 and the back pressure PE in the exhaust passage 12 acts in a closing direction of the valve. In such an outward opening type EGR control valve 63, the entire pressure difference between the intake negative pressure PM and the back pressure PE directly acts on the valve element 66 in a full open state. In FIG. 3, a force Fi represents a force acting on the valve element 66 based on the intake negative pressure PM, a force Fe represents a force acting on the valve element 66 based on the back pressure PE, and a force Fm represents a driving force generated by the stepping motor 64. Therefore, when the valve starts opening from the fully closed position, it is necessary to increase the driving force Fm of the stepping motor 64 to the value greater than a combined force of Fi and Fe.

If the EGR control valve 63 once starts opening, the entire pressure difference does not directly act on the valve element 66 and thus reducing the required driving torque of the stepping motor 64. However, when the valve is driven for opening, since the valve element 66 needs to resist a flowing resistance of the exhaust gas flowing through the EGR passage 62 or a biasing force of the spring 68, a driving torque is required to a certain degree.

Meanwhile, when the valve is driven for closing, the closing operation is assisted by the biasing force of the spring 68 and the like, the required driving torque of the stepping motor 64 may be set to a small value. In such an EGR control apparatus 60, in order to suppress deterioration of emission caused by a delay in EGR reduction at a time of acceleration, a high response is required in a valve closing state and thus, it is necessary to increase the driving speed. Thereupon, by designing the valve such that the aforementioned pressure difference and the biasing force of the spring 68 act on the valve element 66 in its closing direction as in the EGR control valve in the present invention, the response in the valve closing state can be increased.

Meanwhile an appropriate EGR amount varies depending upon a driving state of the engine 1. Further, the exhaust gas is recirculated in accordance with the pressure difference between the intake passage 11 and the exhaust passage 12, and this pressure difference also varies in accordance with the driving state of the engine 1. Therefore, it is preferable to appropriately adjust the opening degree of the EGR control valve 63 in accordance with the driving state of the engine 1. A control manner of the EGR control apparatus 60 for adjusting the opening degree of the EGR control valve will be hereinafter explained.

Figure 4:
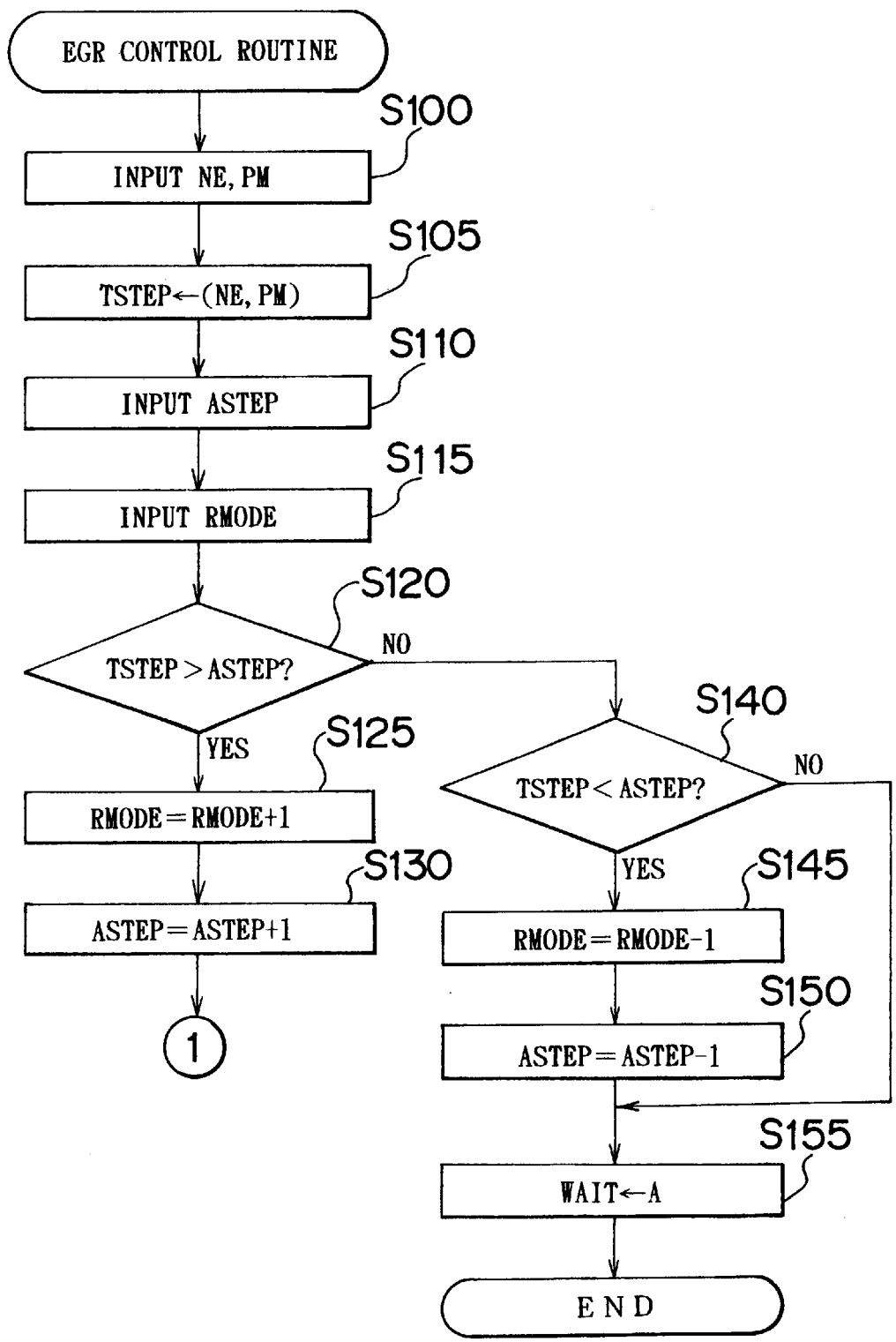
FIG. 4 is a flowchart showing control process of an EGR control routine.
Figure 5:
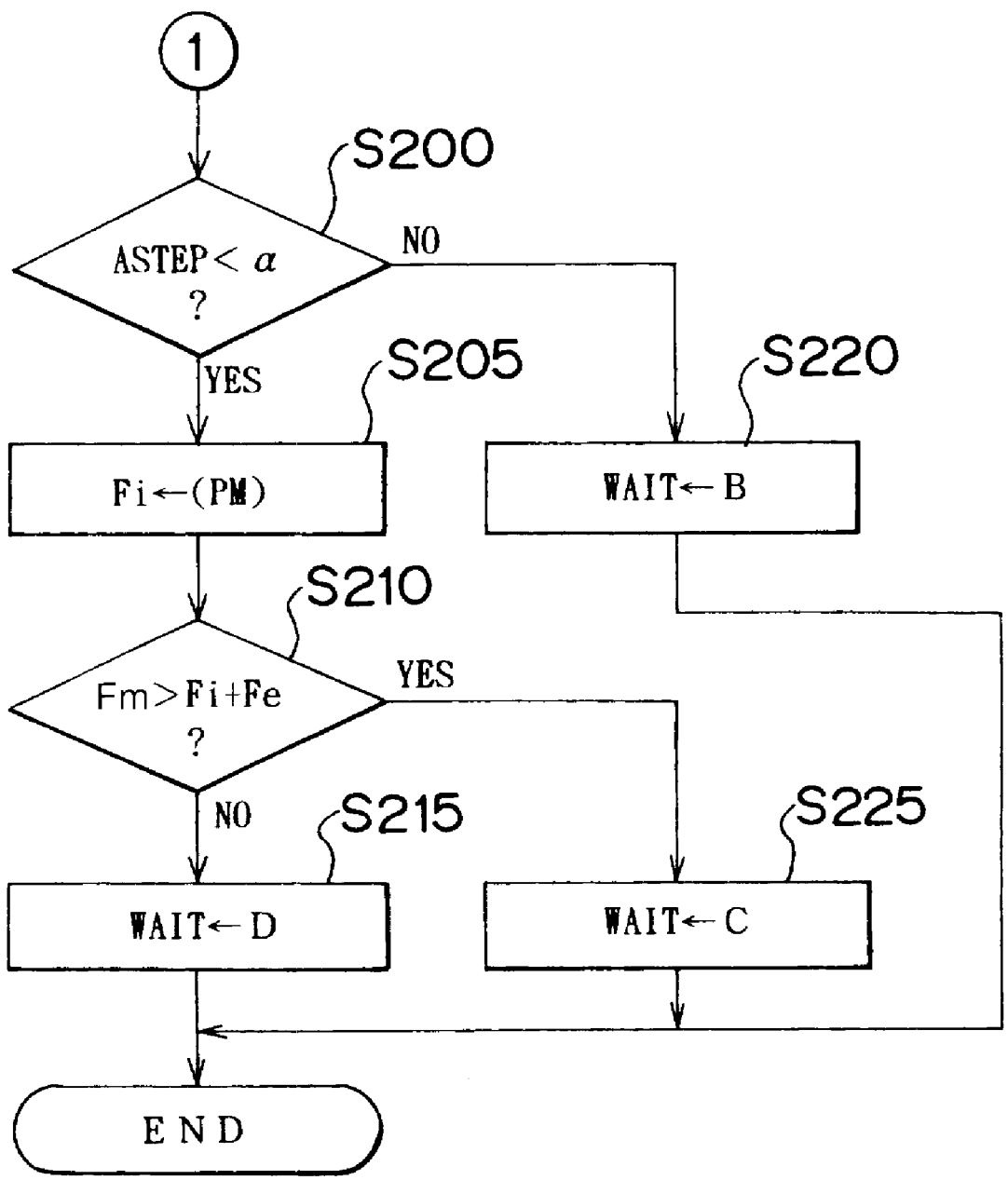
FIG. 5 is a flowchart showing control process of the EGR control routine.

FIGS. 4 and 5 are flowcharts showing the process of an EGR control routine for controlling the opening degree of the EGR control valve 63.

The process of the aforementioned routine is executed by the electronic control apparatus 51 as an interrupt process at every elapse of an exciting phase changing synchronism WAIT which is set when executing the process of the routine. Further, the driving circuit 52 of the stepping motor 64 at that time changes the pattern of the exciting voltage applied to the driving coil 69 in accordance with an actual exciting pattern RMODE which is set when executing the routine last time. In the present embodiment, the exciting voltage applied to the driving coil 69 changes such that the EGR control valve 63 is driven in the opening direction by sequentially adding the value of the actual exciting pattern RMODE, and the exciting voltage applied to the driving coil 69 changes such that the EGR control valve 63 is driven in the closing direction by sequentially subtracting the value of the actual exciting pattern RMODE. That is, when the processing of this routine is started, the EGR control valve 63 is actually driven for opening and closing in accordance with the actual exciting pattern RMODE which is set when executing the present routine last time.

Upon start of this routine, in step S100, the electronic control apparatus 51 first inputs the number of engine revolution NE calculated based on the detection result of the revolution number sensor 25 and based on the intake negative pressure PM detected by the intake pressure sensor 37.

In subsequent step S105, the electronic control apparatus 51 calculates a target step number TSTEP from a known map of the engine revolution number NE and the intake negative pressure PM. The target step number TSTEP indicates the frequency of changing the pattern of the exciting voltage from the fully closed position, i.e., a reference position (0 step) of the EGR control valve 63. As described above, the number of changing the pattern is in complete relation to the opening degree of the EGR control valve 63. Therefore, this target step number TSTEP indirectly indicates the target opening degree of the EGR control valve, and is set so as to obtain an appropriate opening degree in accordance with the driving state of the internal combustion engine 1.

Next, in step S110, the electronic control apparatus 51 inputs an actual step number ASTEP. This actual step number ASTEP indicates the number of changing the pattern of the exciting voltage required for driving the EGR control valve 63 from the fully closed position to the current opening degree. If the pattern of the exciting voltage is changed one time, the actual step number ASTEP is increased or decreased by one step. The actual step number ASTEP also indirectly indicates the current opening degree of the EGR control valve 63 as the target step number TSTEP. In the present embodiment, as the target step number TSTEP and the actual step number ASTEP are greater, the opening degree of the EGR control valve 63 is greater.

In the next step S115, the electronic control apparatus 51 inputs an actual exciting pattern RMODE indicating the current exciting voltage pattern.

In the subsequent step S120, the electronic control apparatus 51 judges whether or not the target step number TSTEP is greater than the actual step number ASTEP. If it is judged that the target step number TSTEP is greater (YES), that is, the actual opening degree of the EGR control valve 63 is at the closing side with respect to the target opening degree and thus, it is necessary to drive the control valve 63 in its opening direction. In this case, the electronic control apparatus 51 proceeds to step S125.

On the other hand, if it is judged that the actual step number ASTEP is greater (NO) in step S120, the electronic control apparatus 51 proceeds to step S140. In step S140, the electronic control apparatus 51 judges whether or not the target step number TSTEP is smaller than the actual step number ASTEP, in an inverse manner to step S120. If it is judged that the target step number TSTEP is smaller (YES), that is, the actual opening degree of the EGR control valve 63 is at the opening side with respect to the target opening degree and thus, it is necessary to drive the control valve 63 in its closing direction. In this case, the electronic control apparatus 51 proceeds to step S145.

If it is judged NO in step S140, that is, the actual step number ASTEP and the target step number TSTEP coincide with each other, the electronic control apparatus 51 proceeds to step S155 while maintaining the current actual exciting pattern RMODE. Then, the electronic control apparatus 51 inputs a constant A to the exciting phase changing synchronism WAIT and then, terminates the process of the present routine.

That is, in this case, after the elapse of time corresponding to the constant A of the exciting phase changing synchronism WAIT, the next routine is executed. However, since the actual exciting pattern RMODE has not been changed that time, opening and closing operation of the EGR control valve is not conducted.

Next, described hereinafter is the operation in the case where step S140 which judges that the target step number TSTEP is smaller (YES), i.e., the EGR control valve 63 is driven in closing direction.

In that case, the electronic control apparatus 51 subtracts 1 from the actual exciting pattern RMODE in step S145. Therefore, after the elapse of the exciting phase changing synchronism WAIT, the EGR control valve 63 is driven in the closing direction by 1 step. In the subsequent step S150, the electronic control apparatus 51 also subtracts 1 from the actual step number ASTEP. Then the electronic control apparatus 51 proceeds to step S155 where the constant A is input to the exciting phase changing synchronism WAIT, and the process of the present routine is terminated.

In this case also, after the elapse of the time corresponding to the constant A of the exciting phase changing synchronism WAIT, the next routine is executed. At that time, since the value 1 is subtracted from the actual exciting phase pattern RMODE, the EGR control valve 63 is driven in the closing direction by 1 step.

As described above, when the EGR control valve 63 is driven in the closing direction and when the opening degree is kept unchanged, the constant A of the exciting phase changing synchronism WAIT is set. The exciting phase changing synchronism WAIT is inversely proportional to a reciprocal number of the driving speed of the stepping motor 64. Therefore, as the value of the exciting phase changing synchronism WAIT is greater, the driving speed of the stepping motor 64 becomes slower.

Next, described hereinafter is the operation in the case where step S120 which judges that the actual step number ASTEP is greater than the target step number TSTEP (YES) and the EGR control valve 63 is driven in the opening direction.

In this case, the electronic control apparatus 51 adds 1 to the actual exciting pattern RMODE in step S125. Therefore, after the elapse of the exciting phase changing synchronism WAIT, the EGR control valve 63 is driven in the opening direction by 1 step. Then, the electronic control apparatus 51 also adds 1 to the actual step number ASTEP in the subsequent step S130, and further proceeds to step S200 as shown in FIG. 5.

In step S200, the electronic control apparatus 51 judged whether or not the actual step number ASTEP is smaller than a constant α. If it is judged that the actual step number ASTEP is smaller than the constant α (YES), that is, the EGR control valve 63 is in the fully closed position or in the vicinity thereof, and the exhaust system side and the intake system side of the EGR passage 62 are not completely communicated. In such a state, the entire pressure difference between the intake negative pressure PM and the back pressure PE acts on the valve element 66 of the EGR control valve 63 as shown in FIG. 3, and since the stepping motor 64 needs to lift the valve element 66 against the force (Fi+Fe) based on the pressure difference, a large torque is required for driving the valve.

On the other hand, if the actual step number ASTEP is equal to or greater than the constant α (NO), the exhaust system side and the intake system side of the EGR passage 62 are communicated, it is not necessary to generate a high torque required for the case where the actual step number ASTEP is smaller than the constant α (YES). However, even in such a state, when the EGR control valve 63 is driven in the opening direction, the flowing resistance of the exhaust gas acts on the valve element 66, and it is necessary to resist the biasing force of the spring and therefore, requiring a driving torque higher than that generated in the case where the valve is to be closed. Thereupon, in such a case, in step S220, the electronic control apparatus 51 inputs a constant B greater than the constant A which has been set last time when the valve is closed. After setting the exciting phase changing synchronism WAIT in this manner, the electronic control apparatus 51 terminates the process of the present routine.

In this case, after the elapse of a time corresponding to the constant B of the exciting phase changing synchronism WAIT, the next process of the present routine is started. At that time, the EGR control valve 63 is driven in the opening direction by 1 step. Since the constant B is greater than the constant A, the time required until the EGR control valve is driven is longer than the time when the EGR control valve is driven in the closing direction. This means that the driving speed of the stepping motor 64 is slower than that in the case where the valve is driven for closing, and the driving torque increases correspondingly.

In step S200, when the actual step number ASTEP is smaller than the constant α, the process proceeds to step S205 where the electronic control apparatus 51 calculates the force Fi based on the intake negative pressure PM acting on the valve element 66 from the intake negative pressure which has been input in step S100.

After estimating the force Fi based on the intake negative pressure PM acting on the valve element 66 in this manner, the process proceeds to step S210 where the electronic control apparatus 51 judges whether or not the driving force Fm of the stepping motor 64 at a time when the exciting phase changing synchronism WAIT is set to a constant C is greater than a sum of the force Fi based on the intake negative pressure PM and the force Fe acting on the valve element 66 based on the back pressure PE. In the present embodiment, as variation in the back pressure is smaller than that in the intake negative pressure PM, the force Fe acting on the valve element 66 based on this back pressure is given as a constant. Further, the constant C is a value which is further greater than the constant B to be set in step S220, and this is a value for further decreasing the driving speed of the stepping motor 64 so as to further increase the driving torque.

In step S210, when the driving force Fm of the stepping motor 64 is greater than the sum of the force Fi and the force Fe (YES), the electronic control apparatus 51 sets the exciting phase changing synchronism WAIT set to the constant C in step S225. After setting the exciting phase changing synchronism WAIT, the electronic control apparatus 51 terminates the process of the present routine. Also in this case, after the elapse of a time corresponding to the constant C of the exciting phase changing synchronism WAIT, the next process of the present routine is executed. At that time, the EGR control valve 63 is driven in the opening direction by 1 step. Since the constant C is greater than the constant B, the driving speed of the stepping motor 64 is further decreased.

On the other hand, when it is judged that the sum of the forces Fi and Fe is greater (NO) in step S210, even if the exciting phase changing synchronism WAIT is set to the constant C to further decrease the driving speed, a torque sufficient to open the EGR control valve 63 cannot be obtained. In such a case, in step 215, the electronic control apparatus 51 sets the exciting phase changing synchronism WAIT to a constant D which is greater than the constant C. After setting the exciting phase changing synchronism WAIT in this manner, the electronic control apparatus 51 terminates the process of the present routine.

Also in this case, after the elapse of the time corresponding to the constant D of the exciting phase changing synchronism WAIT, the next process of the present routine is executed, and the EGR control valve 63 at that time is driven in the opening direction by 1 step. Since the constant D is greater than the constant C, the driving speed of the stepping motor 64 is further decreased and therefore, the driving torque generated by the motor 64 is further increased.

The process of the above-described EGR control routine will be hereinafter summarized.

The process of the present routine is executed by the electronic control apparatus 51 at every elapse of the exciting phase changing synchronism WAIT which is set last time when the present routine has been executed. At that time, the driving circuit 52 changes the pattern of the exciting voltage applied to the driving coil 69 in accordance with the actual exciting pattern RMODE which has been set last time when the present routine is executed, and the EGR control valve 63 is opened or closed by 1 step so as to approach the target opening degree.

In the present routine, the exciting phase changing synchronism WAIT, i.e., the driving speed of the stepping motor 64 is changed depending upon the following four cases:

i) At the time of closing valve driving . . . in this case, there is no resisting force acting on the valve element (or a force in a direction for assisting to open the valve acts on the valve element 66), and high response is required. Therefore, the exciting phase changing synchronism WAIT is set to relatively a small value A such that sufficient driving speed is secured.

ii) At the time of opening valve driving (opening degree position other than the fully closing position) . . . in this case, since a biasing force of the spring 68 and a flowing resistance of the exhaust gas flowing through the EGR passage 62 act on the valve element, the driving speed of the stepping motor 64 is slightly decreased, and the exciting phase changing synchronism WAIT is set to the value B which is greater than the constant A so as to obtain required driving torque.

iii) At the time of opening valve driving (when the valve starts opening from the fully closed position) . . . in this case, since the entire pressure difference between the intake negative pressure PM and the back pressure PE acts on the valve element 66, especially a high driving torque is required. Therefore, the exciting phase changing synchronism WAIT is set to the value C which is greater than the constant B so as to secure a sufficient driving torque.

iv) At the time of opening valve driving (specific driving region) . . . . Since the magnitude of the intake negative pressure PM varies in accordance with the driving state of the internal combustion engine 1, the pressure difference acting on the valve element 66 becomes especially large in a specific driving region, and even if the exciting phase changing synchronism WAIT is set to the constant C to enhance the driving torque, the required driving torque can not be obtained. In this case, the exciting phase changing synchronism WAIT is set to the value D which is further greater than the constant C such that the required driving torque can be obtained even if the driving speed is slow.

As described above, according to the present embodiment, undesirable deterioration in the response can be prevented while maintaining a required driving torque, by changing the driving speed of the stepping motor 64 in accordance with the magnitude of the force acting on the valve element 66 of the EGR control valve 63.

As explained above, according to the present embodiment, the following effects can be obtained.

At the time of opening operation of the EGR control valve 63 when a great driving force is required so as to cope with the flowing resistance of the exhaust gas flowing through the EGR passage 62 and the biasing force of the coil spring 68, a necessary driving torque can be obtained by decreasing the driving speed of the stepping motor 64.

When the valve starts opening from the fully closed position in which the pressure difference between the intake negative pressure PM and the back pressure PE directly acts on the valve element 66, a required driving torque can be obtained by further decreasing the driving speed of the stepping motor 64.

If the driving speed at that time is changed in accordance with the pressure difference between the intake negative pressure PM and the back pressure PE, undesirable deterioration in the response can be suppressed while maintaining the required driving torque.

When a large torque is required as in the above case, it is possible to suppress deterioration in the response by decreasing the driving speed of the stepping motor 64 to a level sufficient for obtaining the required driving torque.

On the other hand, when the EGR control valve 63 is driven for closing in which a required driving torque is small and the high response is required for suppressing deterioration in emission, it is possible to drive the control valve while being assisted by the flowing resistance of the exhaust gas and the coil spring and therefore, it is possible to increase the driving speed of the stepping motor 64 and to enhance the response.

By changing the driving speed of the stepping motor 64 in accordance with the driving torque and the required level of the response, it is possible to control the opening and closing operation of the EGR control valve 63 with excellency even with a small and inexpensive stepping motor 64 for generating a small output.

The modification of the present embodiment will be described hereinafter.

Although the driving speed of the stepping motor 64 when the valve opens from its fully closed position is changed in accordance with the magnitude of the pressure difference between the intake negative pressure PM and the back pressure PE acting on the valve element 66 in the present embodiment, the driving speed in the valve-opening direction after the valve is opened may be changed in accordance with the pressure difference. In this case, a response speed when the valve is driven in the opening direction after the valve is opened can be enhanced as high as possible.

Although the force Fi based on the intake negative pressure PM acting on the valve element 66 from the intake negative pressure PM detected by the intake pressure sensor 37 in the above embodiment, the magnitude of the intake negative pressure may be estimated from the engine revolution number NE and the throttle opening degree, and the force Fi may be calculated based on the estimated intake negative pressure PM.

Similarly, the magnitude of the intake negative pressure PM may be estimated from the intake air amount and the engine revolution number NE, and the force Fi based on the intake negative pressure PM acting on the valve element 66 based on the estimated intake negative pressure PM may be calculated.

Similarly, the intake negative pressure PM may be estimated from the engine revolution number NE and the fuel injection amount to calculate the force Fi. If the driving speed of the stepping motor 64 is calculated by estimating the intake negative pressure PM from the engine revolution number NE and parameters reflecting the load state of the engine such as the throttle opening degree, the intake air amount and the fuel injection amount and the like, it is possible to control the driving speed of the stepping motor 64 even if the internal combustion engine includes no intake pressure sensor 37. Further, if the target opening degree of the EGR control valve 63 is calculated from the engine revolution number NE and parameters reflecting the load state of the engine such as the throttle opening degree, the intake air amount and the fuel injection amount and the like, since common parameters can be used for calculating the target opening degree of the EGR control valve 63 and the driving speed of the stepping motor 64, the control operation can be simplified.

Instead of estimating the external force (force based on the pressure (difference between the intake negative pressure PM and the back pressure PE, where PE=Fi+Fe) acting on the EGR control valve 63 from the intake negative pressure PM measured or estimated as described above as in the above embodiment or as in the above structure, a pressure sensor (back pressure sensor) for directly measuring the exhaust gas pressure may be provided in the exhaust passage 12, and the external force may be estimated based on the estimated exhaust gas pressure. Further, both the back pressure sensor and the intake pressure sensor 37 may be provided, and the external force acting on the control valve 63 may be directly measured. In such a case, it is possible to appropriately control the opening and closing operation of the EGR control valve 63 in spite of large variation in the exhaust gas pressure.

Instead of calculating the force Fi or the force Fe calculated from the detected or estimated intake negative pressure PM and the like to change the driving speed based on the comparison of the calculated force and the driving force Fm of the stepping motor 64 as in the above embodiment or as in the above structure, the driving speed of the stepping motor 64 may be changed in accordance with the driving region of the internal combustion engine 1. It is possible to previously obtain the relation between the driving force Fm and the driving speed of the stepping motor 64. Further it is also possible to previously obtain the relation between the driving region of the internal combustion engine 1 and the magnitude of the force based on the pressure difference between the intake negative pressure PM and the back pressure PE acting on the valve element 66 of the EGR control valve 63. Therefore, the above structure makes it possible to control driving of the EGR control valve 63 in the same manner as that of the present embodiment.

In the EGR control of the present embodiment, it is also possible to control, for example, the change of the response of the stepping motor in accordance with battery voltage as is conventionally known.

The present invention should not be limited only to the structure for driving the EGR control valve 63 by the stepping motor 64 as in the present invention, and another driving means having a characteristic that a driving speed and a driving torque are opposed to each other, and capable of enhancing the driving torque by decreasing the driving speed, such as an electric motor other than the stepping motor may be used.

What is claimed is:

1. An exhaust gas recirculation control apparatus for an internal combustion engine, comprising:

an outward opening type control valve for adjusting a flow rate of an exhaust gas recirculated through an exhaust gas recirculation passage of the internal combustion engine, the control valve being arranged so that an exhaust gas pressure is exerted on the control valve in a closing direction thereof;

driving means for opening and closing the control valve, a driving speed of the driving means having an inverse relation to a driving torque thereof when the control valve is opened and closed; and control means for changing the driving speed of the driving means when the control valve is driven in its opening direction in accordance with a force acting on the control valve external to a driving force applied to the control valve by the driving means.

2. An exhaust gas recirculation control apparatus according to claim 1, wherein the control means sets the driving speed of the driving means to a first speed as the control valve is moved away from a fully closed position of the control valve and then, after the control valve has been partially opened, the control means sets the driving speed to a second speed which is faster than the first speed.

3. An exhaust gas recirculation control apparatus according to claim 1, wherein, when the control valve is driven in the opening direction, the control means sets a driving speed in accordance with a pressure difference between an exhaust gas pressure and an intake pressure acting on the control valve.

4. An exhaust gas recirculation control apparatus according to claim 3, wherein, when opening the control valve from a fully closed position, the control means sets the driving speed of the driving means in accordance with the pressure difference.

5. An exhaust gas recirculation control apparatus according to claim 4, further comprising estimating means for estimating the pressure difference based on a revolution speed of the engine and an engine load.

6. An exhaust gas recirculation control apparatus according to claim 1, wherein the driving means is a stepping motor.

7. An exhaust gas recirculation control apparatus according to claim 6, wherein the control means changes an interval for increasing and decreasing a number of steps of the stepping motor.

8. An exhaust gas recirculation control apparatus for an internal combustion engine, comprising:

an outward opening control valve for adjusting a flow rate of an exhaust gas recirculated through an exhaust gas recirculation passage of the internal combustion engine, the control valve being arranged so that an exhaust gas pressure is exerted on the control valve in a closing direction thereof;

driving means for opening and closing the control valve, wherein, when the control valve is opened and closed, a driving speed of the driving means is inversely related to a driving torque thereof; and control means for setting the driving speed of the driving means, when the control valve is opened from a fully closed position, in accordance with a pressure difference between an exhaust gas pressure and an intake pressure acting on the control valve.

9. An exhaust gas recirculation control apparatus according to claim 8, further comprising estimating means for estimating the pressure difference based on a revolution speed of the engine and an engine load.

10. An exhaust gas recirculation control apparatus for an internal combustion engine, comprising:

an outward opening control valve for adjusting a flow rate of an exhaust gas recirculated through an exhaust gas recirculation passage of the internal combustion engine, the control valve being arranged so that an exhaust gas pressure is exerted on the control valve in a closing direction thereof;

driving means for opening and closing the control valve, the driving means having a driving speed inversely related to a driving torque thereof when the control valve is opened and closed; and control means for setting the driving speed of the driving means, when opening the control valve from a fully closed position, to a first speed and, after the control valve has been partially opened, setting the driving speed to a second speed faster than the first speed.

* * * * *